US008918893B2

(12) United States Patent
Hadley

(10) Patent No.: US 8,918,893 B2
(45) Date of Patent: Dec. 23, 2014

(54) MANAGING A FAULT CONDITION BY A SECURITY MODULE

(71) Applicant: Hewlett-Packard Development Company, L.P., Houston, TX (US)

(72) Inventor: Ted A. Hadley, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 103 days.

(21) Appl. No.: 13/662,678

(22) Filed: Oct. 29, 2012

(65) Prior Publication Data

US 2014/0123322 A1    May 1, 2014

(51) Int. Cl.
*G06F 7/04* (2006.01)
*G06F 21/60* (2013.01)

(52) U.S. Cl.
CPC .............. *G06F 21/60* (2013.01); *G06F 21/602* (2013.01)
USPC ................................... 726/26; 726/34; 726/35

(58) Field of Classification Search
CPC ............................. G06F 21/60; G06F 21/602
USPC ................................................ 726/26, 34–35
See application file for complete search history.

(56) References Cited

U.S. PATENT DOCUMENTS

| | | | |
|---|---|---|---|
| 3,990,069 A | 11/1976 | Schuman | |
| 4,575,610 A | 3/1986 | Gavin | |
| 4,807,284 A | 2/1989 | Kleijne | |
| 4,811,288 A | 3/1989 | Kleijne | |
| 5,099,485 A | 3/1992 | Bruckert | |
| 5,159,629 A | 10/1992 | Double | |
| 5,309,387 A | 5/1994 | Mori | |
| 5,353,350 A | 10/1994 | Unsworth | |
| 5,596,718 A | 1/1997 | Boebert | |
| 5,656,931 A * | 8/1997 | Lau et al. ...................... | 324/522 |
| 5,790,670 A | 8/1998 | Bramlett | |
| 5,858,500 A | 1/1999 | MacPherson | |
| 6,396,400 B1 | 5/2002 | Epstein, III | |
| 6,828,915 B2 | 12/2004 | Gottlieb | |
| 7,015,823 B1 | 3/2006 | Gillen | |
| 7,247,791 B2 | 7/2007 | Kulpa | |
| 7,282,635 B2 | 10/2007 | Utsunomiya | |
| 7,549,064 B2 | 6/2009 | Elbert | |
| 7,743,262 B2 | 6/2010 | Walmsley | |
| 7,945,786 B2 | 5/2011 | Kumar | |
| 8,245,026 B1 | 8/2012 | Moore | |
| 2002/0002683 A1 | 1/2002 | Benson | |
| 2002/0084090 A1 | 7/2002 | Farquhar | |

(Continued)

FOREIGN PATENT DOCUMENTS

| | | |
|---|---|---|
| WO | WO9622541 | 7/1996 |
| WO | WO 9622541 A1 * | 7/1996 |

OTHER PUBLICATIONS

Ted A. Hadley, U.S. Appl. No. 13/052,755 entitled Methods, Systems, and Apparatus to Prevent Memory Imprinting filed Mar. 21, 2011 (55 pages).

(Continued)

*Primary Examiner* — Samson Lemma

(57) ABSTRACT

A microcontroller is awakened from a lower power state in response to a trigger indication indicative of a fault condition. After the awakening, the microcontroller performs a security action with respect to secret information in the security module in response to the fault condition.

19 Claims, 4 Drawing Sheets

(56) References Cited

U.S. PATENT DOCUMENTS

| | | |
|---|---|---|
| 2006/0259788 A1 | 11/2006 | Elbert |
| 2009/0086965 A1 | 4/2009 | Glendinning |
| 2009/0099025 A1 | 4/2009 | Uchaykin |
| 2010/0270923 A1 | 10/2010 | Froehlich |
| 2012/0081859 A1 | 4/2012 | Christo |
| 2012/0141753 A1 | 6/2012 | Hunrath |
| 2012/0184326 A1 | 7/2012 | Asterland |
| 2012/0254637 A1* | 10/2012 | Yasaki et al. .................. 713/300 |

OTHER PUBLICATIONS

Sanapala et al., Effect of Lead-free Soldering on Key Material Properties of FR-4 Printed Circuit Board Laminates, IEEE 2008 (5 pages).

Ted A. Hadley, International Application No. PCT/US2012/058422 entitled Security Shield Assembly filed Oct. 2, 2012 (24 pages).

* cited by examiner

MANAGING A FAULT CONDITION BY A SECURITY MODULE

BACKGROUND

A security module can be used to provide security functions for protecting data. The security module can include a circuit board having electronic circuitry to perform the security functions. The security module can store secret information, such as a cryptographic key, that can be used for cryptographically protecting data (by encrypting data using the cryptographic key).

A security module may be subject to attack by a hacker to obtain secret information stored in the security module. The attack may involve physical penetration of or other physical tampering with the security module.

BRIEF DESCRIPTION OF THE DRAWINGS

Some embodiments are described with respect to the following figures.

DETAILED DESCRIPTION

Figure 1:
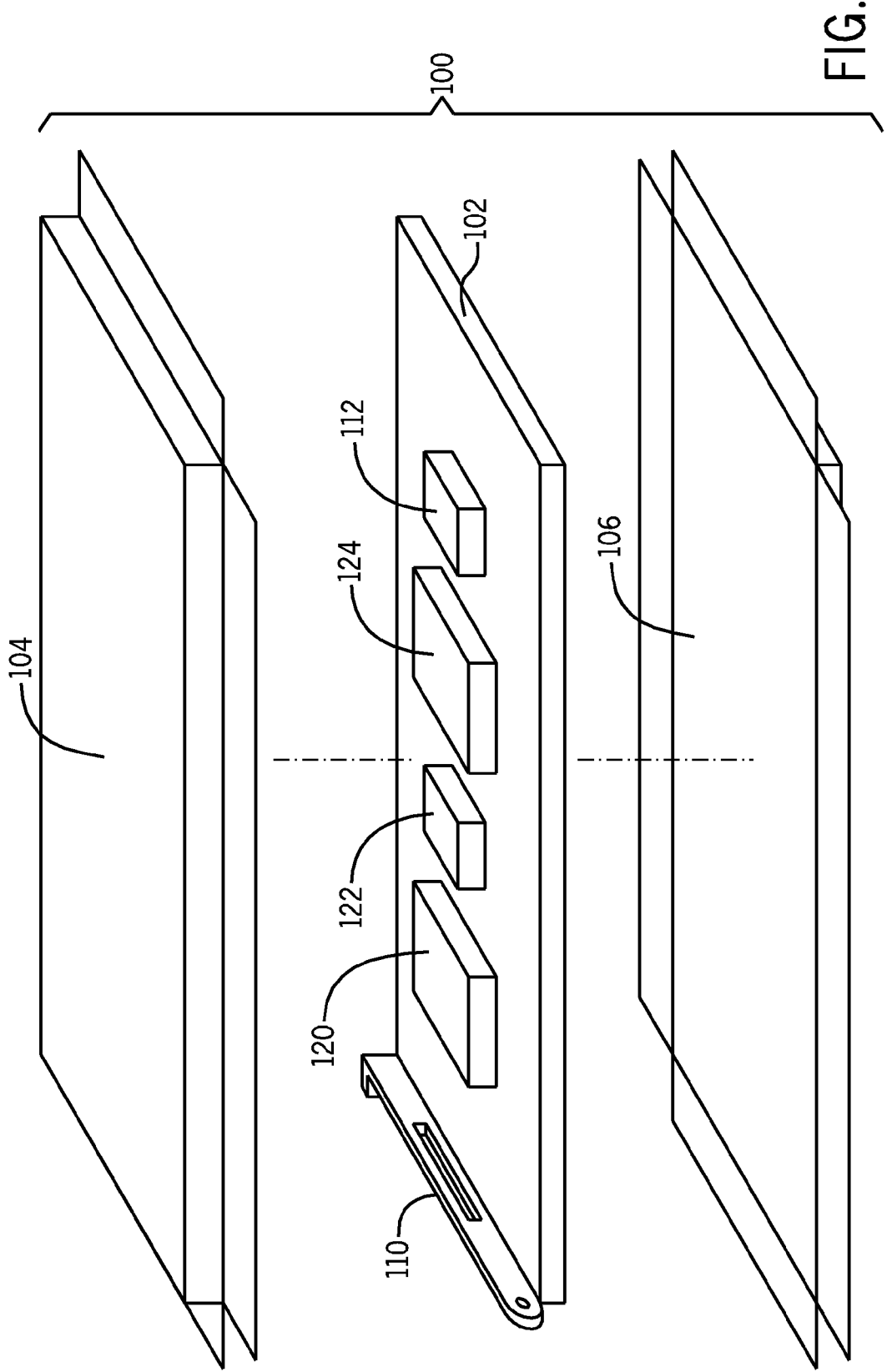
FIG. 1 is an exploded side view of a security module that incorporates some implementations.

A security module (sometimes referred to as a hardware security module) can be used to perform cryptographic computations or other security functions on data, such as data of a financial transaction, electronic signature verification, and so forth. The cryptographic computation or other security function on data is performed to protect the data from unauthorized access. To perform its security functions, the security module can store secret information, which can be a cryptographic key or other type of secret information (e.g. password, etc.).

In some implementations, a security module may include a circuit board, which is removably connectable to a system, such as a computer system, a tablet, a game appliance, a television set-top box, and so forth. Data from the system can be provided to the security module, which can encrypt the data using a cryptographic key, for example. The encrypted data can then be provided to the system, which can communicate the encrypted data with another entity, such as over a network.

Measures can be provided to protect the secret information that is stored by the security module from unauthorized access. For example, such measures can include detecting physical tampering with the security module, detecting physical penetration (such as by using a drill) of a cover of the security module, performing access control of information stored by the security module (to control whether a requesting device has permission to access the information), avoiding imprinting of data in a storage in the security module, detecting a temperature out-of-range condition or a battery voltage out-of-range condition, erasing the secret information, and so forth.

At least some of the measures noted above can be provided by a security processor that is part of the security module. The security module has a battery for powering the security module when the security module is disconnected from an external power source, such as the power source of the system to which the security module is removably connectable. As a result, it is desirable that the security processor consume as little power as possible, particularly when the security module is disconnected from an external power source and is running on battery power. If improperly designed, a security processor having low power consumption may not be computationally powerful enough to perform various tasks relating to protection of secret information in the security module in a timely manner. On the other hand, a security processor that has sufficient computation power may consume too much power such that short battery lifetime becomes an issue.

In accordance with some implementations, functionality of a security processor can be divided into two portions, where a first portion includes a monitoring circuit and a second portion includes a microcontroller. The monitoring circuit can be implemented using an integrated circuit (IC) chip, such as a field programmable gate array (FPGA), an application-specific integrated circuit (ASIC), or any other IC chip. The microcontroller can be implemented using a microprocessor, a digital signal processor, an FPGA, an ASIC, or any other type of processing circuit.

By splitting functionalities of a security processor into the monitoring circuit and the microcontroller, the microcontroller can be placed into a lower power state when the security module is running on battery power. Thus, when operating on battery power alone, the microcontroller can be placed into a lower power state when the microcontroller is idle (the microcontroller is not actively performing functions related to protecting secret information). On the other hand, the monitoring circuit remains in an active state to allow the monitoring circuit to detect one of various fault conditions that may result in the secret information being compromised if a security action is not taken. If the monitoring circuit detects any such fault condition, the monitoring circuit can activate a trigger indication to cause the microcontroller to awaken from its lower power state to perform the corresponding security action. In this manner, power consumption is reduced while still allowing sufficient processing power to be provided on demand to perform security actions in response to detected fault conditions.

In some implementations, when the security module is powered by an external power source, both the monitoring circuit and the microcontroller can remain in their respective active states. However, in alternative implementations, the microcontroller can be placed into a lower power state when the microcontroller is idle even when the security module is powered by the external power source.

A "lower power state" of the microcontroller refers to a state of the microcontroller where the microcontroller has shut off at least some of its functionalities to consume less power. An "active" state of the microcontroller refers to a state of the microcontroller where the microcontroller is ready to perform any of its configured tasks. In the ensuing discussion, the lower power state of the microcontroller is referred to as a "sleep state."

In some implementations, the monitoring circuit and the microcontroller are discrete IC devices. However, in alternative implementations, the monitoring circuit and microcontroller can be integrated into a common IC device that has a first portion (including the monitoring circuit) and a second portion (including the microcontroller), where the second portion can be transitioned from an active state to a sleep state when idle, while the first portion remains in the active state.

FIG. 1 an exploded side perspective view of a security module 100 that includes an electronic circuit 102 (e.g. a printed circuit board) that can be covered by an upper cover 104 and a lower cover 106. As depicted in FIG. 1, various components are mounted on the electronic circuit 102. Although components are depicted as being mounted on just one surface of the electronic circuit 102, it is noted that in other implementations, components can also be mounted on the opposite surface of the electronic circuit. The components can include a main processor 120, a monitoring circuit 122, and a microcontroller 124.

The monitoring circuit 122 is used for detecting one of various predefined fault conditions. The microcontroller 124 is used to perform respective security actions in response to the detected fault conditions. The main processor 120 is used to perform security functions of the security module 100 using the secret information stored in the security module 100. For example, the main processor 120 can perform encryption and decryption on data using a cryptographic key.

The electronic circuit 102 has a bracket 110 to allow the security module 100 to be removably connected to a system. A battery 112 can also be provided on the electronic circuit 102 to supply battery power for the security module 100 when the security module 100 is not connected to an external power source. In other implementations, the battery 112 can be provided at other locations, such as at a location where the battery 112 is not enclosed by the covers 104 and 106.

Figure 2:
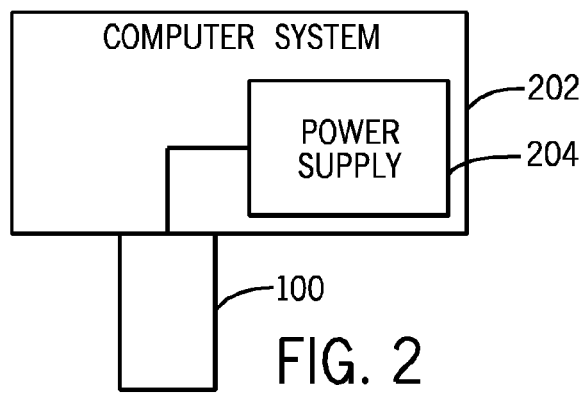
FIG. 2 is a block diagram of an example arrangement including the security module according to some implementations.

FIG. 2 illustrates an example arrangement in which the security module 100 is plugged into a computer system 202 (or other type of system). The computer system 202 has a power supply 204, which supplies external power to the security module 100 when the security module 100 is plugged into the computer system 202. Thus, when the security module 100 is plugged into the computer system 202, the security module 100 is powered by an external power source, namely the power supply 204. On the other hand, if the security module 100 is not plugged into the computer system 202, then the security module 100 is powered by its battery 112 (FIG. 1).

Figure 3:
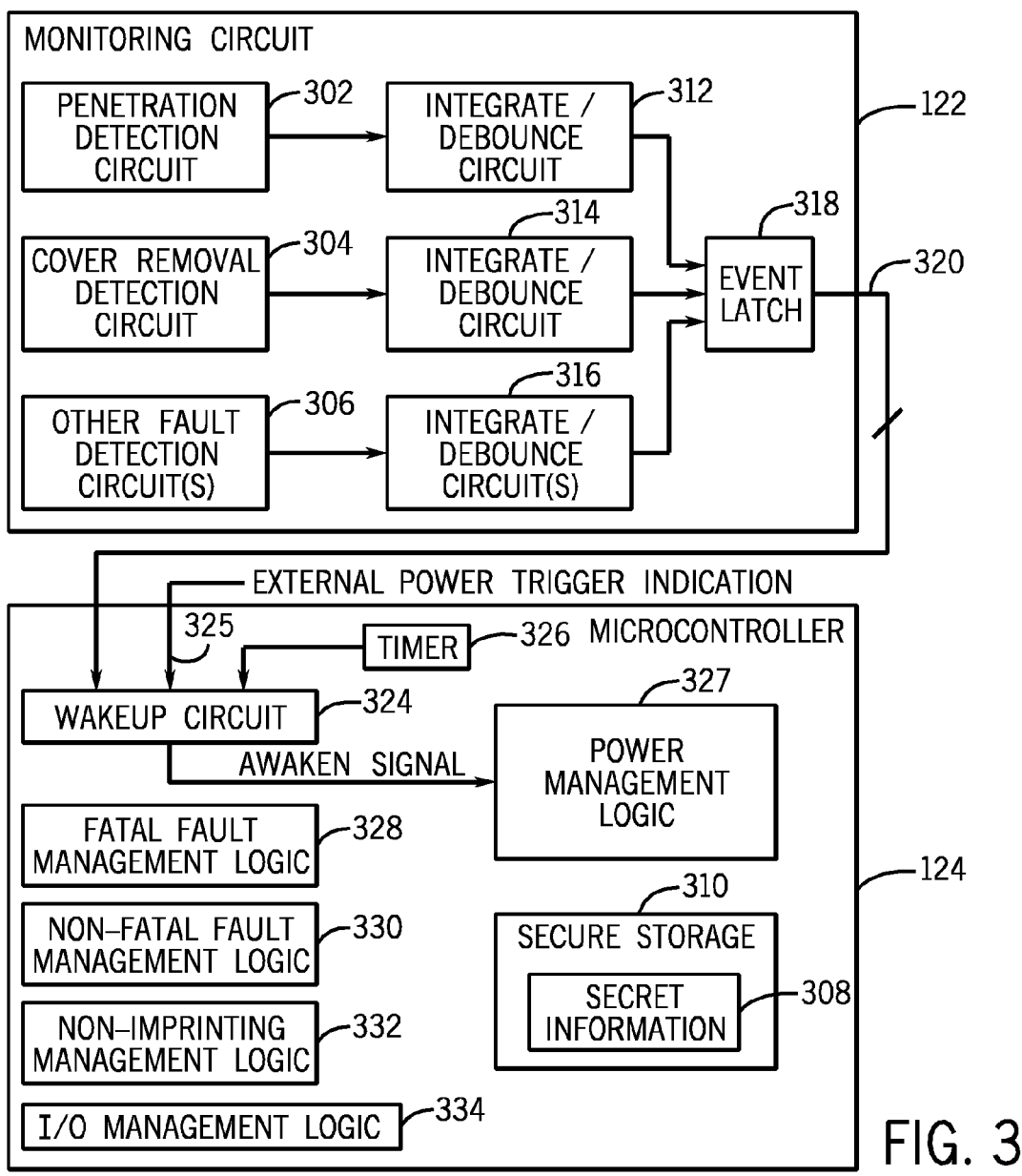
FIG. 3 is a block diagram of a monitoring circuit and a microcontroller of a security module, in accordance with some implementations.

FIG. 3 illustrates the monitoring circuit 122 and the microcontroller 124 of the security module 100, in accordance with some implementations. In some examples, the monitoring circuit 122 can include a penetration detection circuit 302 to detect penetration through the covers 104 and 106 (FIG. 1) of the security module 100. For example, a hacker may attempt to drill through the cover 104 or 106 to gain access to electronic components on the circuit board 102. Once a hole is drilled through the cover 104 or 106, the hacker may attempt to run a probe through the hole to access signals on the electronic circuit 102, such as to obtain the secret information.

To provide the ability to detect penetration through the cover 104 or 106, the cover 104 or 106 can include layers of electrically conductive patterns that when physically penetrated by a drill or other item results in an open circuit condition that can be detected by the penetration detection circuit 302.

The monitoring circuit 122 further includes a cover removal detection circuit 304, which can detect when the covers 104 and 106 are removed from the circuit board 102 (due to tampering of the security module 100). When the covers 104 and 106 are engaged to the electronic circuit 102 of FIG. 1, a signal can be provided indicating such engagement. If the covers 104 and 106 are disengaged from the electronic circuit 102, then the signal changes state, which provides an indication of cover removal that can be detected by the cover removal detection circuit 304.

In some implementations, the penetration detection circuit 302 and cover removal detection circuit 304 can perform fault detection based on whether a respective continuity circuit is short circuited or open circuited. When the fault condition is not present, then the continuity circuit is an electrical short circuit to provide circuit continuity. On the other hand, when the fault condition is present, then the continuity circuit is broken (e.g. an electrically conductive pattern in the cover 104 or 106 is broken by a drill, or tampering with the cover 104 or 106 results in disengagement of the cover 104 or 106 from its expected engaged position). Breaking the continuity circuit results in an open circuit that sharply increases the electrical resistance, which can be detected by the corresponding detection circuit 302 or 304.

The monitoring circuit 122 can also include other fault detection circuit(s) 306 to detect other fault conditions, such as a battery being out-of-range (the battery voltage has dropped below, or increased above, a predefined threshold), a temperature being out-of-range condition (the temperature of the security module 100 has fallen outside a predefined temperature range which indicates that the security module 100 is too hot or too cold), and/or some other fault condition. In some examples, each fault detection circuit 306 can use a sensor (e.g. temperature sensor or voltage sensor) to measure a respective parameter (e.g. temperature or battery voltage). The fault detection circuit 306 can include logic to compare the measured parameter to respective threshold(s).

There can be two types of fault conditions: a fatal fault condition and a non-fatal fault condition. Each of the fault conditions detectable by the detection circuits 302, 304, and 306 can be either a fatal fault condition or a non-fatal fault condition, based on rules specifying which fault conditions are fatal and which fault conditions are non-fatal. A fatal fault condition may cause the microcontroller 124 to erase (zeroize) secret information 308 in a secure storage 310 of the microcontroller 124. On the other hand, a non-fatal fault condition causes the secret information 308 to be locked, such that a requestor (such as the main processor 120 of FIG. 1) is prevented from accessing the secret information 308.

As examples, fatal fault conditions can include the following: a condition in which physical penetration has been detected through the cover 104 or 106 of the security module 100, a condition in which disengagement of the cover 104 or 106 has been detected, a condition in which the temperature is "extremely" out-of-range (the temperature is outside a first predefined range that indicates the extreme out-of-range temperature condition), and a condition in which the battery voltage is out-of-range.

Examples of non-fatal fault conditions include the following: a condition in which the temperature is out-of-range (but not extremely out-of-range) (the temperature is outside a second predefined temperature range that is narrower from the first predefined temperature range), or a condition in which an externally applied power supply voltage is outside its predefined range.

In other examples, fatal and non-fatal fault conditions can be defined differently according to other rules.

Although reference is made to detecting both fatal and non-fatal fault conditions using the same monitoring circuit 122, it is noted that in other implementations, fatal and non-fatal fault conditions can be detected using separate monitoring circuits.

As further depicted in FIG. 3, integrate/debounce circuits 312, 314, and 316 are provided at the outputs of respective detection circuits 302, 304, and 306. The integrate/debounce circuits 312, 314, and 316 are used to prevent false detection of fault conditions. In some cases, mechanical shock, vibration, thermal expansion, or other conditions may cause a transient condition that may be incorrectly detected as a fault condition. Such transient issues last for a relatively short period of time, such as in the range of tens of microseconds. On the other hand, a real fault condition lasts for a longer period of time, such as in the millisecond to hundreds of milliseconds time range. The integration functionality of an integrate/debounce circuit is used to discriminate between a transient event and a non-transient event, based on how long the corresponding event lasts. The indication of the time ranges corresponding to transient and non-finish transient events can be configured in one of a number of different ways. For example, the indication of time range can be in the form of a continuously variable parameter, such as a parameter in a configuration register, which can be varied. Alternatively, the indication of time range can be in the form of a set of pre-defined discrete values, where one of the discrete values can be selected based on a configuration input or value of a configuration register. As yet another alternative, the indication of time range can be in the form of a constant value that is not changeable.

The outputs of the integrate/debounce circuits 312, 314, and 316 are provided to an event latch 318, which can store indications corresponding to the detected fault conditions (as detected by the detection circuits 302, 304, and 306). In some other examples, the event latch 318 can store respective bits corresponding to outputs of the detection circuits 302, 304, and 306. For example, a first bit can indicate whether or not the penetration detection circuit 302 has detected penetration of the security module 100, a second bit can indicate whether or not the cover removal detection circuit 304 has detected disengagement of the covers 104 and 106, and further bit(s) of the event latch 318 can indicate whether or not the other fault detection circuit(s) 306 has (have) detected other fault condition(s). In other examples, instead of using bits, multi-bit flags can be used to indicate states of the outputs of the detection circuits 302, 304, and 306.

The event latch 318 provides an output 320 to the microcontroller 124. Although the output 320 is depicted as a single line, it is noted that the output 320 can actually include multiple signals corresponding to the different fault conditions that have been detected.

The output 320 from the event latch 318 is provided to a wakeup circuit 324 of the microcontroller 124. The output 320 from the event latch 318 contains at least one trigger indication that indicates that a fault condition has occurred. The wakeup circuit 324 can also receive an external power trigger indication 325, which is activated when the security module 100 is connected to an external power source. Another input to the wakeup circuit 324 is a timer trigger indication from a timer 326, which can activate the timer trigger indications on a periodic basis.

Upon receiving any of the foregoing trigger indications, if the microcontroller 124 is in a sleep state, the wakeup circuit 324 can issue an awaken signal to awaken the microcontroller 124 from the sleep state. The awaken signal is provided to a power management logic 327, which is responsible for transitioning the microcontroller 124 between the sleep state and the active state.

The microcontroller 124 includes a fatal fault management logic 328, which is able to manage a fatal fault condition detected by the monitoring circuit 122. In some examples, in response to a fatal fault condition (indicated by a fault trigger indication in the output 320 from the monitoring circuit 122), the fatal fault management logic 328 can erase the secret information 308 in the secure storage 310 of the microcontroller 124.

The microcontroller 124 also includes a non-fatal fault management logic 330, which performs tasks for managing a non-fatal fault. As examples, in response to a non-fatal fault condition (indicated by a fault trigger indication in the output 320 from the monitoring circuit 122), the non-fatal fault management logic can lock access to the secret information 308, such that a requestor (e.g. main processor 120 of FIG. 1) is unable to access the secret information 308.

The microcontroller 124 also includes a non-imprinting management logic 332, which performs tasks relating to preventing imprinting of data in the secure storage 310. Non-imprinting management tasks are discussed further below.

The microcontroller 124 also includes an input/output (I/O) management logic 334, which manages I/O operations between the microcontroller 124 and a requestor, such as the main processor 120 of FIG. 1. For example, the main processor 120 can request retrieval of the secret information 308 to allow the main processor 120 to perform a cryptographic operation based on the secret information 308. Such a request is received by the I/O management logic 334, which can retrieve the secret information 308 to provide to the requestor.

As noted above, the fatal fault management logic 328 or non-fatal fault management logic 330 may perform respective tasks in response to activation of a fault trigger indication in the output 320 from the monitoring circuit 122. The non-imprinting management logic 332 can perform its tasks in response to a timer trigger indication from the timer 326. The I/O management logic 334 may perform its respective tasks in response to the external power trigger indication 325.

The management logic 328, 330, 332, and 334 can be implemented as hardware circuitry in the microcontroller 124, or as machine-readable instructions (e.g. software or firmware) executable by the microcontroller 124.

The following discusses causes of data imprinting in the secure storage 310, and tasks that can be performed to avoid data imprinting. The secure storage 310 can be implemented with a semiconductor memory or other type of storage device. Due to various properties of a memory, such as properties of manufacturing processes used to manufacture the memory (e.g. types and amounts of dopants, temperature, composition, etc.), storage of data in the memory can alter the physical characteristics of the memory such that the data becomes imprinted in the memory. As a result of this data imprinting, data values stored in a memory can be determined or read even after those data values have been deleted or over-written, or after a volatile memory has been powered down.

Data imprinting can occur if predominantly static or constant data values are stored in the memory for an extended time period. An example of data values that can remain relatively static or constant over an extended period of time is a cryptographic key or other secret information. If the cryptographic key or other secret information 308 becomes imprinted in the secure storage 310 of the microcontroller 124, then a hacker may be able to derive the secret information 308.

To reduce the likelihood of data imprinting, data values stored at various memory locations of a memory can be intermittently (e.g. periodically) moved to other memory locations of that memory according to one or multiple permutation patterns or schema. The non-imprinting management logic 332 can intermittently move data values from one memory location to another according to a pattern to prevent prolonged exposure of the memory elements of the memory to a particular data value and, therefore, particular state of those memory elements. In some examples, the moving of data values between different memory locations can be performed by the non-imprinting management logic 332 in response to each activation of a timer trigger indication from the timer 326. A timer trigger indication is activated with each expiration of the timer 326.

Figure 4:
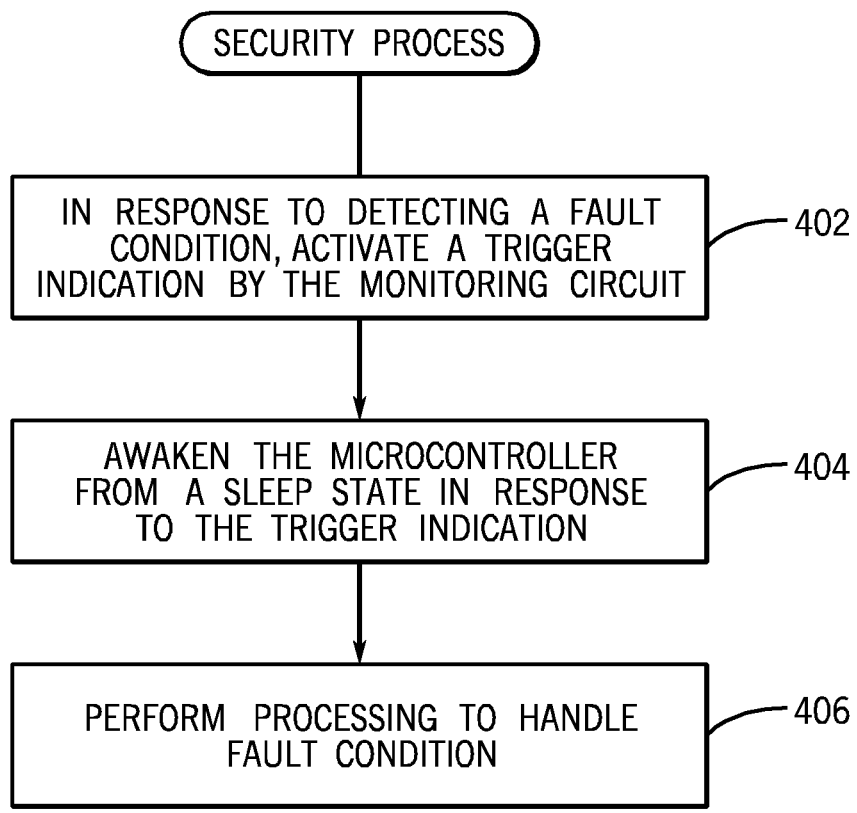
FIGS. 4 and 5 are flow diagrams of security processes performed according to some implementations.

FIG. 4 is a flow diagram of a security process performed by the security module 100 according to some implementations. In response to detecting a fault condition, the monitoring circuit 122 activates (at 402) a fault trigger indication. The microcontroller 124 then awakens (at 404) from a sleep state in response to the fault trigger indication. The microcontroller 124 then performs (at 406) processing to manage the fault condition, where the processing can include erasing the secret information 308 or locking access to the secret information 308.

Figure 5:
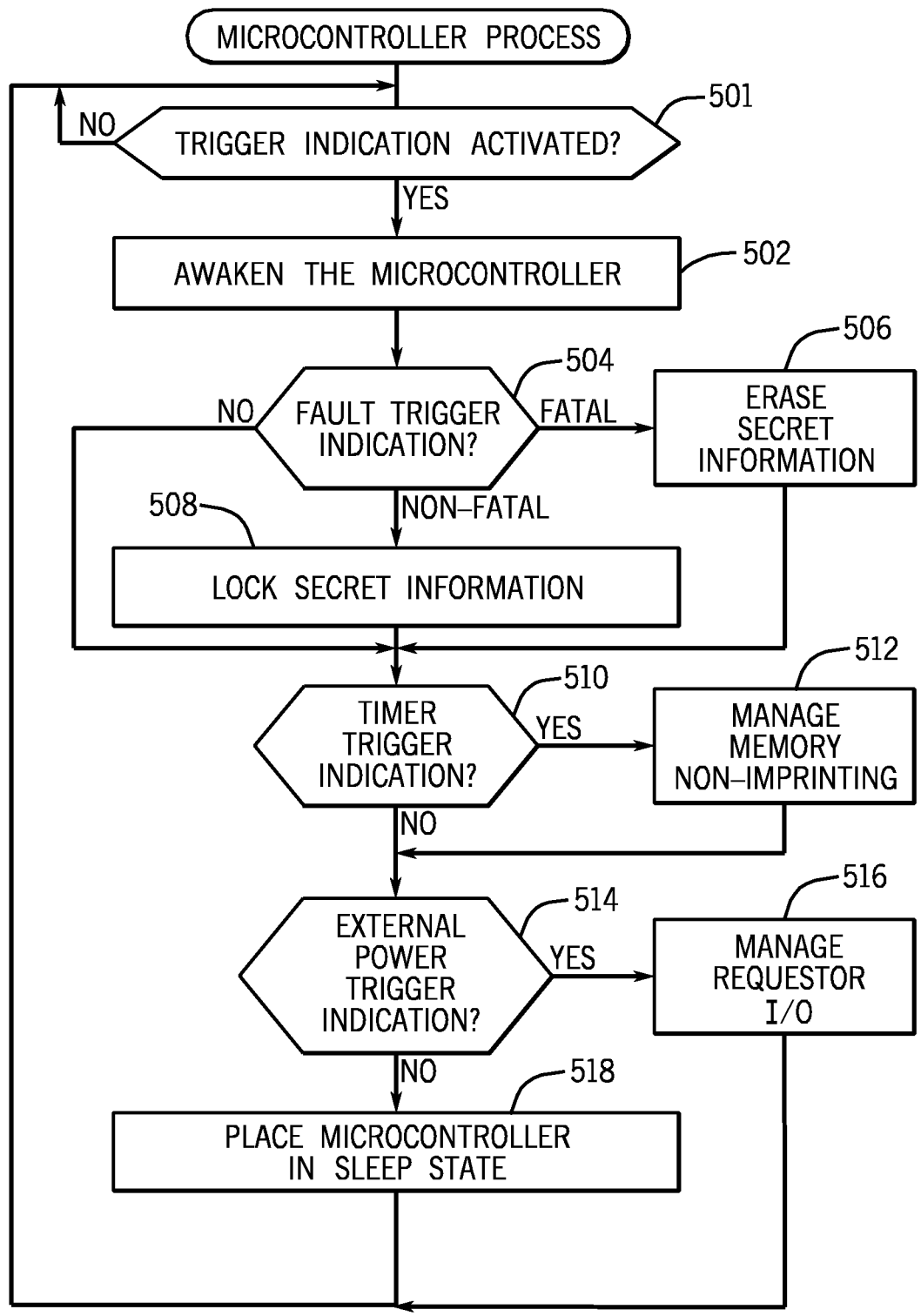

FIG. 5 is a flow diagram of a process performed by the microcontroller 124 according to some implementations. As depicted in FIG. 5, the microcontroller 124 determines (at 501) whether any of various trigger indications has been activated. The trigger indications can be a fault condition trigger indication from the monitoring circuit 122, the external power trigger indication 325, or a timer trigger indication from the timer 326 (FIG. 3). In response to detecting activation of a trigger indication, the microcontroller 502 is awakened from its sleep state to the active state.

Next, the microcontroller 124 determines (at 504) whether the received trigger indication is a fault trigger indication. If not, then the process continues to task 510. However, if the received trigger indication is a fault trigger indication, the microcontroller 124 can perform one of two different security actions depending upon whether the corresponding fault condition is a fatal fault condition or a non-fatal fault condition. If the fault condition is a fatal fault condition, then secret information 308 in the secure storage 310 is erased (at 506). If the fault condition is a non-fatal fault condition, access to the secret information 308 is locked (at 508) such that a requestor is unable to access the secret information 308.

The microcontroller 124 next determines (at 510) whether the received trigger indication is a timer trigger indication. If so, the microcontroller 124 manages (at 512) non-imprinting of the secure storage 310 (as discussed above).

Next, the microcontroller 124 determines (at 514) whether the received trigger indication is an external power trigger indication, which when activated indicates that the security module 100 is powered by an external power source. If so, then I/O requests from an external requestor can be managed (at 516). Thus, I/O access of information in the microcontroller 124 by the external requestor is allowed in response to detecting that the security module is powered by the external power source. On the other hand, I/O access of information in the microcontroller 124 by the external requestor is prevented in response to detecting that the security module is powered by the battery but not the external power source.

If the microcontroller 124 determines that the microcontroller 124 is not powered by the external power source, the microcontroller 124 places itself into the sleep state (at 518).

As noted above, in some implementations, logic of the microcontroller 124 can be implemented as machine-readable instructions. In such implementations, the machine-readable instructions can be executed by a processing circuit of the microcontroller 124.

Data and instructions are stored in respective storage, which can be implemented as one or multiple non-transitory computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EE-PROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method for managing a fault condition, comprising:
in response to detecting the fault condition, activating, by a monitoring circuit of a security module, a trigger indication;
awakening a microcontroller of the security module from a lower power state in response to the trigger indication, wherein the microcontroller has a storage to store secret information; and
performing, by the microcontroller after awakening from the lower power state, a security action with respect to the secret information in response to the fault condition, wherein performing the security action comprises:
determining whether the fault condition is a first type of fault condition or a second type of fault condition; and
in response to determining that the fault condition is the second type of fault condition, locking access to the secret information to prevent access to the secret information that remains stored in the storage of the microcontroller.

2. The method of claim 1, further comprising:
transitioning the microcontroller to the lower power state in response to detecting that the security module is being powered by a battery but not an external power source.

3. The method of claim 1, further comprising:
after performing the security action, transitioning the microcontroller to the lower power state.

4. The method of claim 1, wherein performing the security action further comprises, in response to determining that the fault condition is the first type of fault condition, erasing the secret information from the storage of the microcontroller.

5. The method of claim 4, wherein the first type of fault condition is a fatal fault condition.

6. The method of claim 5, wherein the second type of fault condition is a non-fatal fault condition.

7. A method for managing a fault condition, comprising:
in response to detecting the fault condition, activating, by a monitoring circuit of a security module, a trigger indication;
awakening a microcontroller of the security module from a lower power state in response to the trigger indication, wherein the microcontroller has a storage to store secret information;

performing, by the microcontroller after awakening from the lower power state, a security action with respect to the secret information in response to the fault condition;

transitioning the microcontroller to the lower power state in response to detecting that the security module is being powered by a battery but not an external power source;

preventing input/output access of information in the microcontroller by a processor of the security module in response to detecting that the security module is powered by the battery but not the external power source; and allowing input/output access of information in the microcontroller by the processor in response to detecting that the security module is powered by the external power source.

8. The method of claim 1, further comprising:
repeatedly moving data values of the secret information to different locations in the storage to avoid imprinting of data in the storage.

9. The method of claim 8, further comprising:
issuing, by a timer, timer trigger indications on a periodic basis,
wherein repeatedly moving the data values of the secret information is in response to the timer trigger indications.

10. A security module for managing a fault condition, comprising:
a monitoring circuit to monitor for the fault condition; and
a microcontroller having an active state and a lower power state, and a storage to store secret information, the microcontroller to:
awaken from the lower power state to the active state in response to a trigger indication from the monitoring circuit that indicates presence of the fault condition; and
perform a security action with respect to the secret information to handle the fault condition, wherein to perform the security action, the microcontroller is to:
determine whether the fault condition is a first type of fault condition or a second type of fault condition;
in response to determining that the fault condition is the first type of fault condition, erase the secret information from the storage of the microcontroller; and
in response to determining that the fault condition is the second type of fault condition, lock access to the secret information to prevent access to the secret information that remains stored in the storage of the microcontroller.

11. The security module of claim 10, wherein the fault condition is at least one selected from among a condition indicative of tampering with the security module, a condition indicative of physical penetration through a cover of the security module, a temperature out-of-range condition, and a battery out-of-range condition.

12. The security module of claim 10, further comprising a processor to request access of the secret information and to perform a security function using the secret information.

13. The security module of claim 12, wherein the secret information is a cryptographic key, and the security function includes a cryptographic computation.

14. The security module of claim 10, wherein the microcontroller is to perform a non-imprinting action to avoid data imprinting at the storage.

15. The security module of claim 14, wherein the microcontroller is to repeatedly perform the non-imprinting action in response to trigger indications activated by corresponding expirations of a timer.

16. The security module of claim 10, further comprising a battery, wherein the security module is powered by the battery when the security module is not powered by an external power source, and wherein the microcontroller is to:
transition from the active state to the lower power state in response to the microcontroller being idle and the security module being powered by the battery but not the external power source.

17. The security module of claim 10, further comprising:
a battery; and
a processor separate from the microcontroller, wherein the microcontroller is to further:
prevent input/output access of information in the microcontroller by the processor in response to detecting that the security module is powered by the battery but not by an external power source that is external of the security module; and
allow input/output access of information in the microcontroller by the processor in response to detecting that the security module is powered by the external power source.

18. An article comprising at least one non-transitory machine-readable storage medium storing instructions for managing a fault condition, the instructions upon execution causing a microcontroller to:
awaken the microcontroller from a lower power state based on a trigger indication indicative of the fault condition of a security module; and
after the awakening, perform a security action with respect to secret information stored in a storage in the security module in response to the fault condition, wherein to perform the security action the instructions upon execution cause the microcontroller to:
determine whether the fault condition is a first type of fault condition or a second type of fault condition;
in response to determining that the fault condition is a first type of fault condition, erase the secret information from the storage; and
in response to determining that the fault condition is the second type of fault condition, block access to the secret information to prevent access to the secret information that remains stored in the storage.

19. The article of claim 18, wherein the security module includes a battery and a processor separate from the microcontroller, wherein the instructions upon execution cause the microcontroller to further:
prevent input/output access of information in the microcontroller by the processor in response to detecting that the security module is powered by the battery but not an external power source that is external of the security module; and
allow input/output access of information in the microcontroller by the processor in response to detecting that the security module is powered by the external power source.

* * * * *